United States Patent
Katayama et al.

(10) Patent No.: US 6,629,191 B1
(45) Date of Patent: Sep. 30, 2003

(54) NONVOLATILE MEMORY APPARATUS FOR STORING DATA FROM A HOST

(75) Inventors: Kunihiro Katayama, Chigasaki (JP); Takayuki Tamura, Yokohama (JP); Kazuo Nakamura, Fussa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/340,140

(22) Filed: Jun. 28, 1999

(30) Foreign Application Priority Data

Jun. 29, 1998 (JP) .......................................... p10-182198

(51) Int. Cl.[7] ............................ G06F 12/06; G11C 16/00
(52) U.S. Cl. ...................... 711/103; 711/100; 711/154; 711/202
(58) Field of Search ................................. 711/100, 103, 711/154, 167, 202; 365/120, 222, 189.05, 189.01

(56) References Cited

U.S. PATENT DOCUMENTS

| 5,860,082 A | * | 1/1999 | Smith et al. | 711/103 |
| 6,014,755 A | * | 1/2000 | Wells et al. | 714/8 |
| 6,025,971 A | * | 2/2000 | Inoue et al. | 360/77.08 |
| 6,260,156 B1 | * | 7/2001 | Garvin et al. | 714/8 |

FOREIGN PATENT DOCUMENTS

| JP | 5-27924 | 2/1993 |
| JP | 6-124596 | 6/1994 |

* cited by examiner

*Primary Examiner*—Tuan V. Thai
(74) *Attorney, Agent, or Firm*—Mattingly, Stanger & Malur, P.C.

(57) ABSTRACT

In a memory including a flash memory, the life of the memory is prevented from being decreased due to the high frequency of rewrite operations of data to a specific area. When the erasure frequency of a block 301, storing four sectors of data, is high, each sector of block 301 is transferred to different blocks 302–305 to avoid deterioration of the data of block 301 due to the high frequency of rewriting.

12 Claims, 11 Drawing Sheets

| (a) | 801 | 802 |
|---|---|---|
| invalid | 0 | development address value |
| invalid | 0 | development address value |
| invalid | 0 | development address value |
| invalid | 0 | development address value |

FIG. 9 (b)

| (b) | 801 | 802 |
|---|---|---|
| invalid (803) | 0 | development address value |
| valid (804) | 1 | — |
| valid | 1 | — |
| invalid | 0 | development address value |

NONVOLATILE MEMORY APPARATUS FOR STORING DATA FROM A HOST

BACKGROUND OF THE INVENTION

This invention concerns a memory device, especially a memory device housing data erasure operation, and a memory, using a nonvolatile memory.

Small information-processing equipment use card type semiconductor memories, because the resistance to physical impact vibration is high they require low power consumption. Also, the magnetic disk unit and interface signal and protocol are often compatible.

However there are few restrictions upon the number of times a rewrite operation will take place in the same area of the memory, and the data management system does not take into considerations the rewrite frequency to an identical portion of the memory.

In the conventional semiconductor memory, the rewrite frequency is often restricted because the method of rewriting utilizes stress to apply a strong electric field for rewriting. Therefore, the memory is sometimes damaged and the reliability of the entire memory is compromised, when it the deterioration applied to the management system of the data in magnetic disk unit Such management information is rewritten at a greater frequency than the usual data storage area and as such requires that there is no degradation in the portion of the memory where it is stored. Otherwise, the entire memory would suffer.

Various technology is proposed with advancing the development in which rewrite possible frequency of the memory element itself is improved. For example, in Japanese Laid Open No. 5-27924, the erasure-frequency at the rewrite unit (the erasure unit) of the nonvolatile memory is counted and recorded. In the case of the new writing, the equalizing of erasure frequency between the rewrite unit (the erasure unit) of the nonvolatile memory is attempted by storing in the area with small erasure frequencies. As this result, the life of the memory is extended. Similarly, in Japanese Laid Open No. 6-124596 the erasure frequency is counted at the rewrite unit (the erasure unit) of the nonvolatile memory, recorded, and attempts at equalizing of the erasure frequency are shown by equalizing physical erasure frequency in the whole area on the memory medium. In other words, there is equalizing of the number of rewrites for the entire memory.

SUMMARY OF THE INVENTION

However, the physical housing address on the memory in proportion to the logical address in which the host instructs in the case of the rewrite in the technology always changes, and the physical housing address is changed by the increase in the erasure frequency. Therefore, the following are required with the logical address which the host designates: Address reference table in which the physical address on the memory stored actually corresponds and management information which is similar for it. When the address administration table is established, though the large-scale memory area is required, because address reference of the whole memory area must be possible, it does not have, electric power supply If an address administration table is established, then the memory space allocated therefore should be able to withstand a high rewrite voltage.

Again, in until now nonvolatile memory (of the following, flash memory) in which the rewrite is electrically possible, in order to facilitate the utilization as a memory of the magnetic disk unit compatibility, in making the size of capacity unit (the physical rewrite block) which eliminates the data to be the management unit of the data by magnetic disk unit, it was made to agree with the sector generally used. However, a purpose is to reduce the memory chip area by the improvement in the circuit efficiency and lower cost, and the result is that the capacity of the physical rewrite block increases.

In such flash memory, the size of the management unit (since then, it is called a sector) of the data designated from the host will be different from the size of memory medium of the data of the management unit (the physical rewrite block), and the management practice of the data considering this point is required. For example, it is considered that the sector of the N piece is allocated in one physical rewrite block in order to do the efficient housing, when it is the size in which the size of the physical rewrite block of the memory can store the sector of the multiple (the for example N piece). The rewrite processing (erasure and processing at the block unit and afterwards writing processing) will be conducted even in this case and the case in which only one within the sector of the N piece stored in one physical rewrite block was rewritten on the physical rewrite block. As this result, rewrite frequency of one physical rewrite block increases for N twice in allocating in the 1 sector. This becomes that it will shorten the life of the memory over the necessity and accelerates the equipment degradation in consequence.

In the future, with the aim of the large-capacity low cost which is equal to the magnetic disk unit, since the cost of the flash memory is lowered, the reducing of the memory chip area is required resistant, and the multivalued memory in which one cell memorizes multiple memory bits will be used practically. By this fact, the problem like the superscription seems to become more serious, when the capacity expansion of the physical rewrite block is promoted.

The purpose of this invention is that in the memory that it electrically rewrites block unit erasure processing and makes the possible nonvolatile memory to be memory medium, it prevents degradation of whole memory by the fact that the rewrite of the specific data is frequently carried out or lowering of the reliability, and that it realizes the improvement in the memory life.

The first memory by this invention takes following composition. The control means for reading and writing of the data for semiconductor memory with the reading and writing indication by nonvolatile semiconductor memory in which it is possible rewriting and readout from the outside or addressing at logic housing block unit which is minimum unit for the writing which eliminate memorizing data at the physical block unit is possessed. In the every physical block, the erasure frequency is counted, this control means records it, and logic housing block which the this physics block has allocated is transferred physical block of the development area, when it reached the frequency that erasure frequency of the physical block was beforehand determined.

On the access of this logic housing block in the since then, it is made that it is done for the physical block in this transferred development area to be features. For example, the fixed area of the semiconductor memory is equipped with the development area. And, the sector which for example, are the data management unit of the host, etc. are correspondent to the logic housing block.

In the second memory by this invention, multiple and that it stores it are possible in respect of the logic housing block aforesaid block. Then, in the every logic housing block, the rewrite frequency is counted, the control means records it, and on the access of this logic housing block in the since then, it is made that it transfers the this logic housing block physical block of the development area, when it reached the frequency that the rewrite frequency was beforehand determined, and does it for physical block in the development area moved aforesaid to be features.

Logic housing block of which the error was detected in the readout is transferred physical block in the development area, after it added error detection correction code in every logic housing block that the writing was indicated the control means more and more by the addressing in the third memory by this invention, and after it carried out the correction. Then, it is made that it is done for the physical block in the transferred development area to be features on the access in the since then for the logic housing block.

In the first, second and the third memory, the physical block may do the aforesaid logic housing block, as multiple and that it stores it are possible, and multiple logic housing block are allocated for one physical block in the first, second and the third memory in usual data area control means the. Then, each of multiple logic housing block stored in one physical block may be allocated in the development area in one physical block.

In addition, the writing of the rewrite data is carried out in the rewrite for logic housing block in the development area, when the area of erasure condition that the writing in which the housing of the rewrite data is possible in the physical block that the this logic housing block was allocated is not carried out exists, without eliminating the physical block. Then, in the physical block, it is rewritten, after the physical block is eliminated, when there is no area of the erasure condition, and the data may be written.

In addition, it may have address registration area which can register the address value of transfer tip of the logic housing block every physical block logic housing block. For example, the fixed area of the aforesaid semiconductor memory is equipped with this address registration area. And, address value of the transfer tip of the this logic housing block may be stored every the physical block this block logic housing block. Information processing equipment by this invention makes having any of the memory of the above mention as the external memory and auxiliary memory, to be features.

DETAILED DESCRIPTION OF THE PREFERRED EMBODIMENTS

The preferred embodiment of the present invention is explained in detail below in connection with the drawings.

Figure 1:
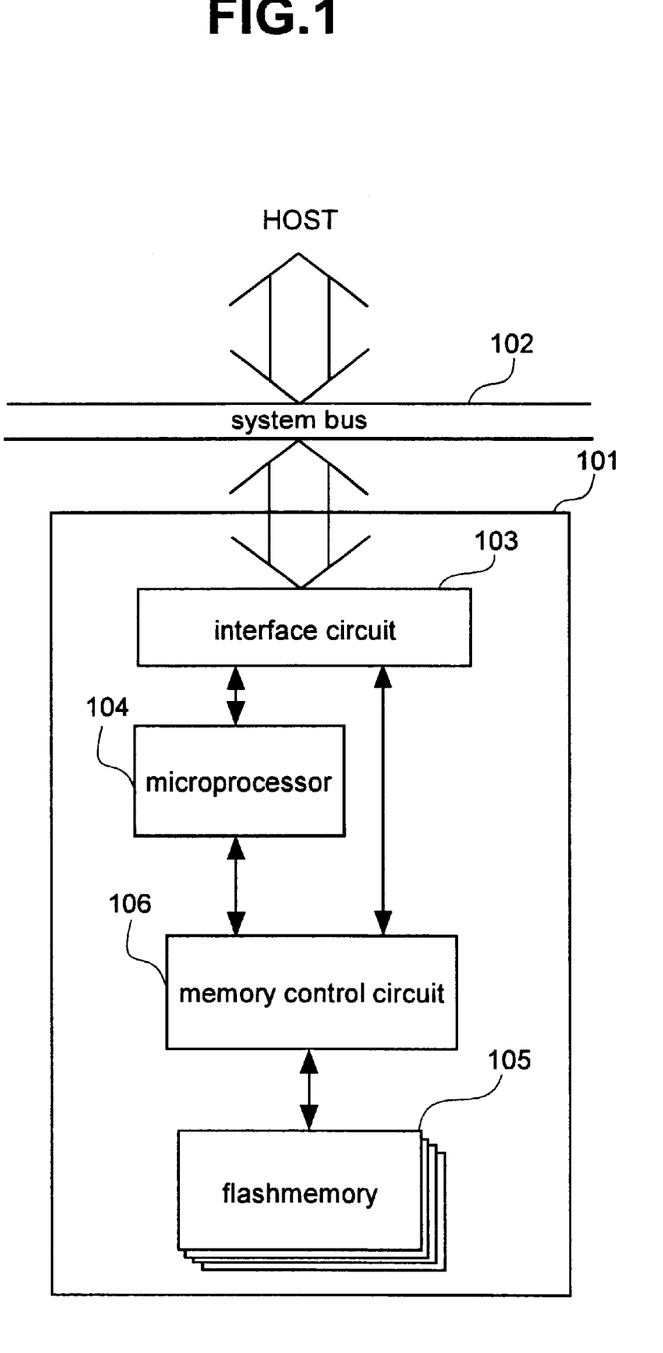
FIG. 1 illustrates a fundamental composition of memory 101 according to the present invention.

FIG. 1 a fundamental composition of the memory 101 according to the present invention. As a memory employed by the present invention, the PC(ATA) card of the PCMCIA standard conformity of the card type can be utilized since it has the features of being small and light.

However, the present invention is not limited to the card type memory. The memory 101 includes interface circuit 103, the microprocessors 104, the flash memory 105, the memory control circuit 106, as it is shown in FIG. 1. An interface circuit 103 takes the interface between system! bus 102 and the memory 101 inside. As a system bus 102, the following are considered: IDE bus, ISA bus, PCI bus, SCSI bus, PC card bus, etc.. A microprocessors 104 controls the processing of the inside of the memory 101.

Control such as the data management on flash memory 105 which explains in the following is realized by the program that this microprocessors 104 was almost stored in the memory (non-illustration) for the program. However, it is also possible to realize by the exclusive hardware. Flash memory 105 are memory medium of the memory 101, and the details is described later.

A memory control circuit 106 forms control signal for controlling the flash memory 105 and the timing, and it temporarily stores the data of readout and writing. Still, the memory control circuit 106 is not indispensable, if it has the function in which the microprocessors 104 can control the memory directly.

To begin with, the fundamental operation in the memory 101 is explained. By the indication from the host, the memory 101 carries out housing and sending out of the data, etc.

In the time, the following are written: Logical, addresses and access commands which to begin with, the host designated through the system bus 102 in the fixed register in the interface circuit 103, etc. By signal change from the interface circuit 103 and reading and writing of the register, the microprocessors 104 understands the access indication from the host, and it carries out the control which is necessary for readout or writing of the data for the flash memory 105 through the memory control circuit 106.

Next, the details of the flash memory 105 used in the this embodiment is explained. Each physical block which is and erasure operating unit can store 4 sector data (and an administrative data accompanies the 4 sector data) And, the area (the physical block) of the erasure all bits become 1, and it is writing possible "1" "0" individually. Still, it may be a possible memory eliminating area that all bits become 0 and that it individually writes "1" in the bit that "0" is recorded on the memory which can be utilized for this invention without limiting to this. And, they are the 512 bytes equal to the magnetic disk unit utilized minimum unit personal computer sector, etc. host data management generally in this embodiment form which explains in the following.

Figure 2:
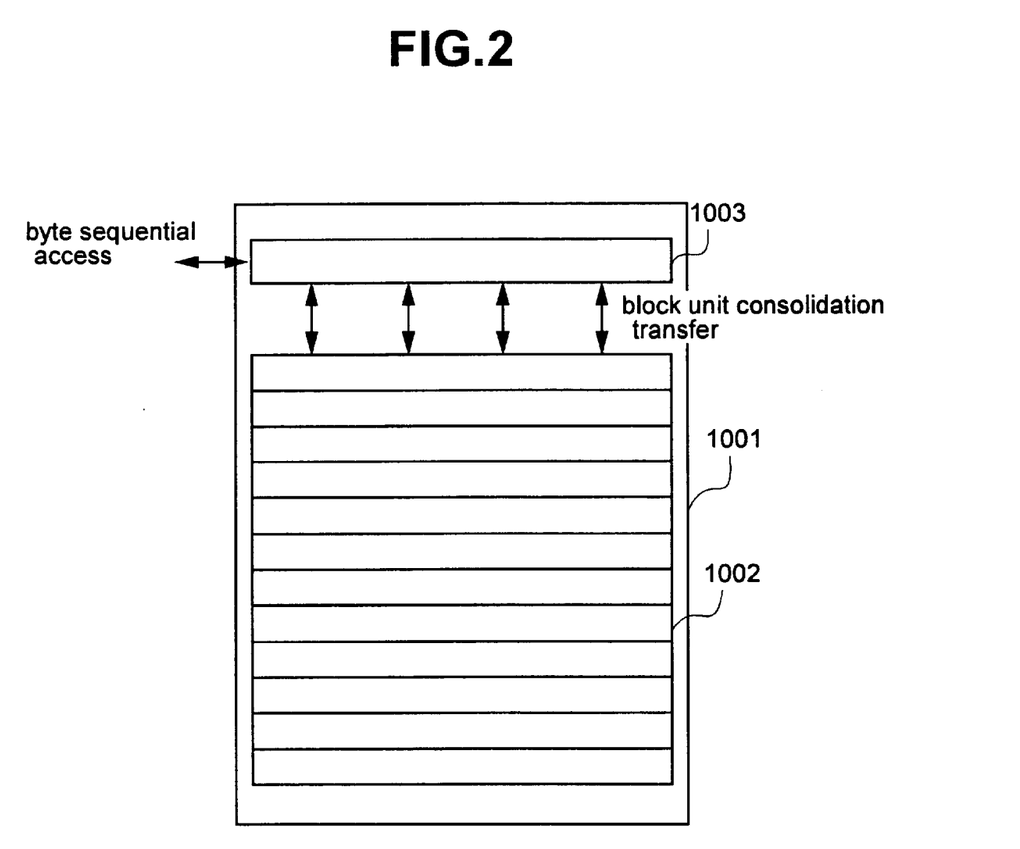
FIG. 2 illustrates details of the inner structure of the flash memory 105.

FIG. 2 illustrates the details of the inner structure of flash memory chip used in this embodiment.

The flash memory chip 1001 is composed of the flash memory array 1002 and buffer memory 1003, as it is shown in the same figure. The flash memory array 1002 has been composed the flash memory cell, and it has been divided to the erasure block (the physical block) unit of the fixed capacity. Erasure operation of the stored data proceeds by the unit of erasure block in the flash memory chip 1001.

For the exchange of the data with the outside, the buffer memory 1003 store the data the erasure block of one unit minute of the flash memory array 1002, and it is composed of the volatile memory such as the SRAM. Between the flash memory array 1002 and the buffer memory 1003, the data is lumped together and is transferred at the erasure block unit.

In the meantime, it puts in and out the data by the byte sequential access between the buffer memory 1003 and outside.: That is to say, it puts in and out the byte data in the block with the addressing in the fixed order. For example, in the lead access, I block of flash memory array 1002 is designated in the address, and the data of the block with the addressing is lumped together and is transferred in the buffer memory 1003. The data is read outside and out by the byte sequential access afterwards.

In the meantime, in the write access, the data of 1 block is written by the byte sequential access in the buffer memory 1003, and the data is written in consolidation transfer of the block unit in the memory arrays 1002 afterwards.

In addition, it is also possible without limiting the access of the buffer memory 1003 to the block boundary in this flash memory chip, read/write optional. Especially, the substitute is possible without carrying out the block erasure at the part for the writing in the light access in the erasure condition in the block. That is to say, the writing of the block which partially faces will be carried out without doing erasure operation by the whole block, if the writing is carried out, by designating the part, when the part that the writing is not carried out after the block erasure exists, (the case in which that again, the part has not been written has been proven).

Still, the memory of FIG. 2 is example, and the, memory used in this invention is not limited to this. For example, there may be not only 1 block minute but also multiple block minute on the capacity of the buffer 1003, and the byte is not sequential, and it may be able to access the exchange between the buffer 1003 and outside at the optional units such as word sequential and bit sequential.

Figure 3:
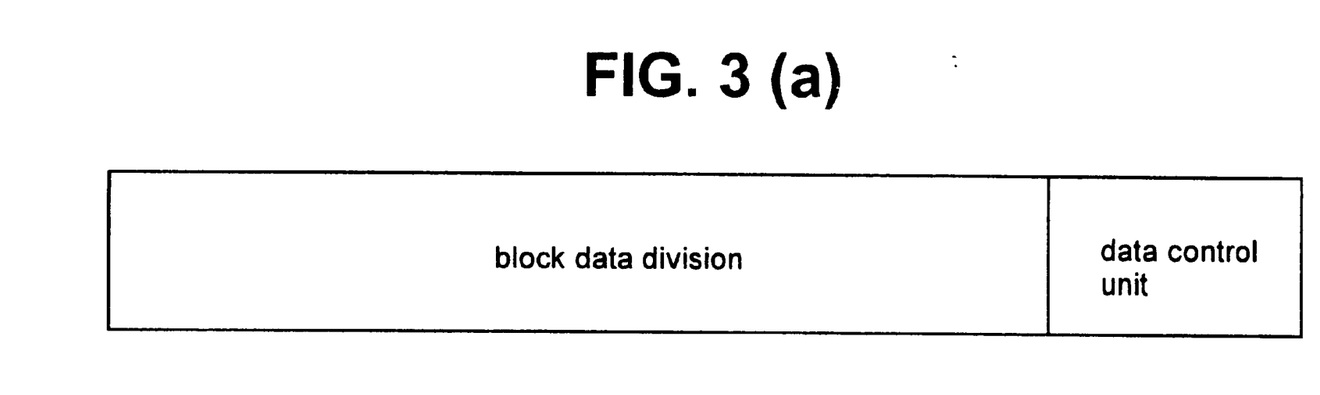
FIG. 3 illustrates an exemplary use of a physical block in the flash memory 105.

FIG. 3 is the figure which showed example of use of physical block in the flash memory 105. The size of the 1 block here is made to be the 2112 bytes. In the example of FIG. 3(*a*), the 1 block is divided into block data division of the 2048(=512×4) byte and management data divisions of the 64 bytes. In management data divisions, in the block data division, the data of the 4 sectors minute is stored, and the data, for example ECC code of the each every sector and describing erasure frequency, rewrite frequencies, etc., is stored block data division.

And, the 1 block has been divided into sector data division 1–4 and sector management data division 1–4 and block management data divisions of four in the example of FIG. 3(*b*). Each size of sector data division 1–4 they are the 512 bytes, and they are the 8 bytes, and they are the 32 bytes sector management data division 1–4 each block management data division. In four sector data division 1–4, the sector data is respectively stored, and ECC codes the data necessary for controlling dealing with sector data, dealing with sector data and describing rewrite frequencies, etc. are stored in sector management data division 1–4. In block management data divisions, data necessary for controlling the block, and data necessary for controlling (it is not made) sector which is not stored in the sector management data divisions, etc. are stored.

Figure 4:
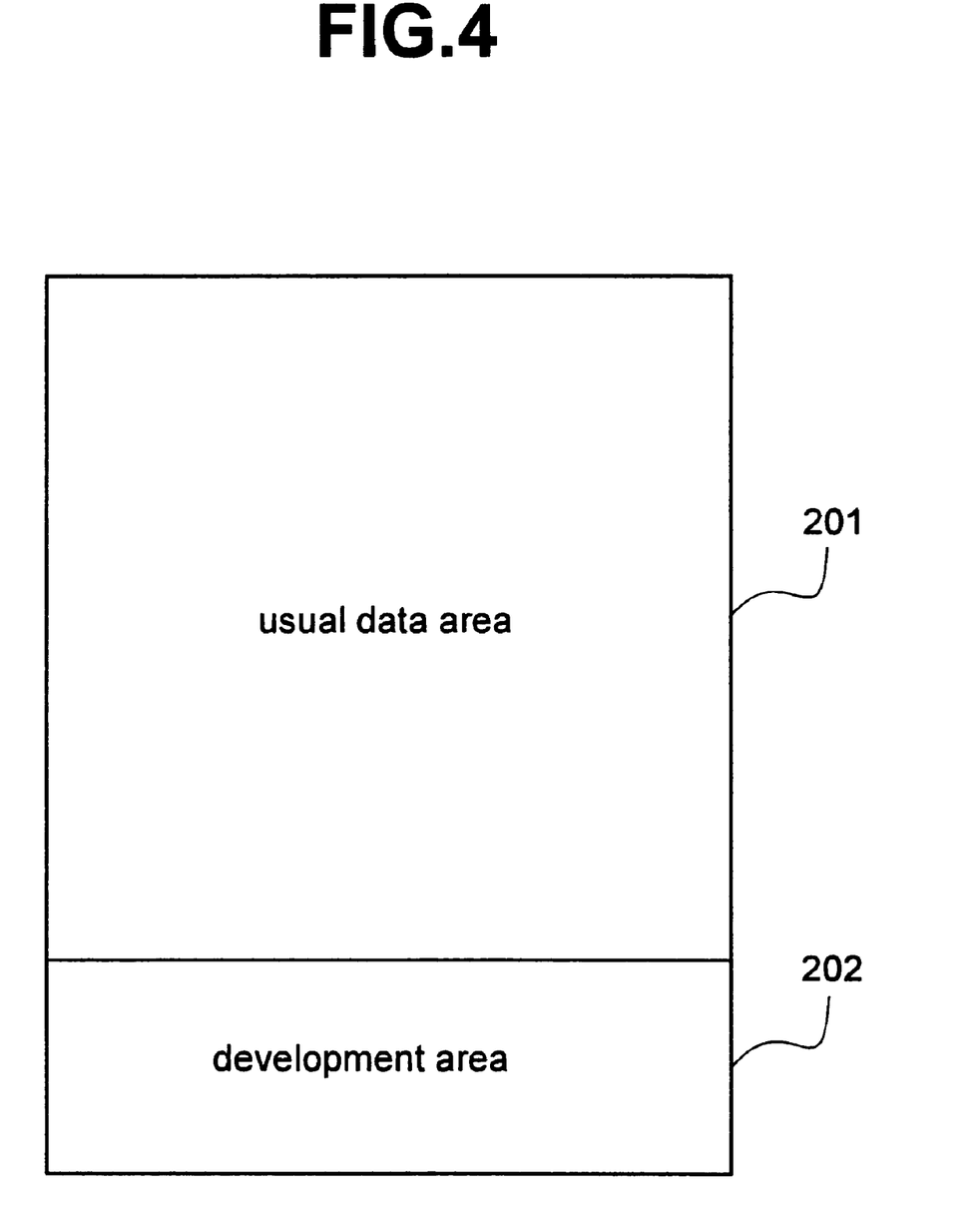
FIG. 4 illustrates a memory map in the flash memory 105.

FIG. 4 is the figure which shows example of data management in the flash memory 105 by this invention, and it shows the aspect of the mapping in some one flash memory chip.

Still, that the program of the microprocessors 104 which controls storing data to the flash memory is changed according to the, chip installation number in order to increase a memory capacity, there is a case in which it is mounted in the memory in the multiple on the flash memory chip, and the mapping shown in the whole memory chip of mounting multiple in the same figure, since it is at inefficiency like, is carried out.

There is no that it comes out, and by doing mapping of the each every chip, it closes in each chip, development and transfer of the storing data area carry out it. However, one mapping may be carried out in.multiple whole memory chips. The memory area of the flash memory 105 is composed of a usual data area 201 and a development area 202, as it is shown in FIG. 4. The usual data area 201 are the area which store the data in proportion to appointment address which the host designated, when the host accesses the memory 101.

In this area, the access unit from the host is stored in one physical block. The development area 202 is a area as a transference tip in changing the data stored in this block, when rewrite frequency of some physical blocks exceeded the constant frequency. In this area, 1 physics block (4 sectors) of the usual data area 201 will be developed in four physical blocks, because the 1 physics block is allocated for the 1 sector.

Figure 5:
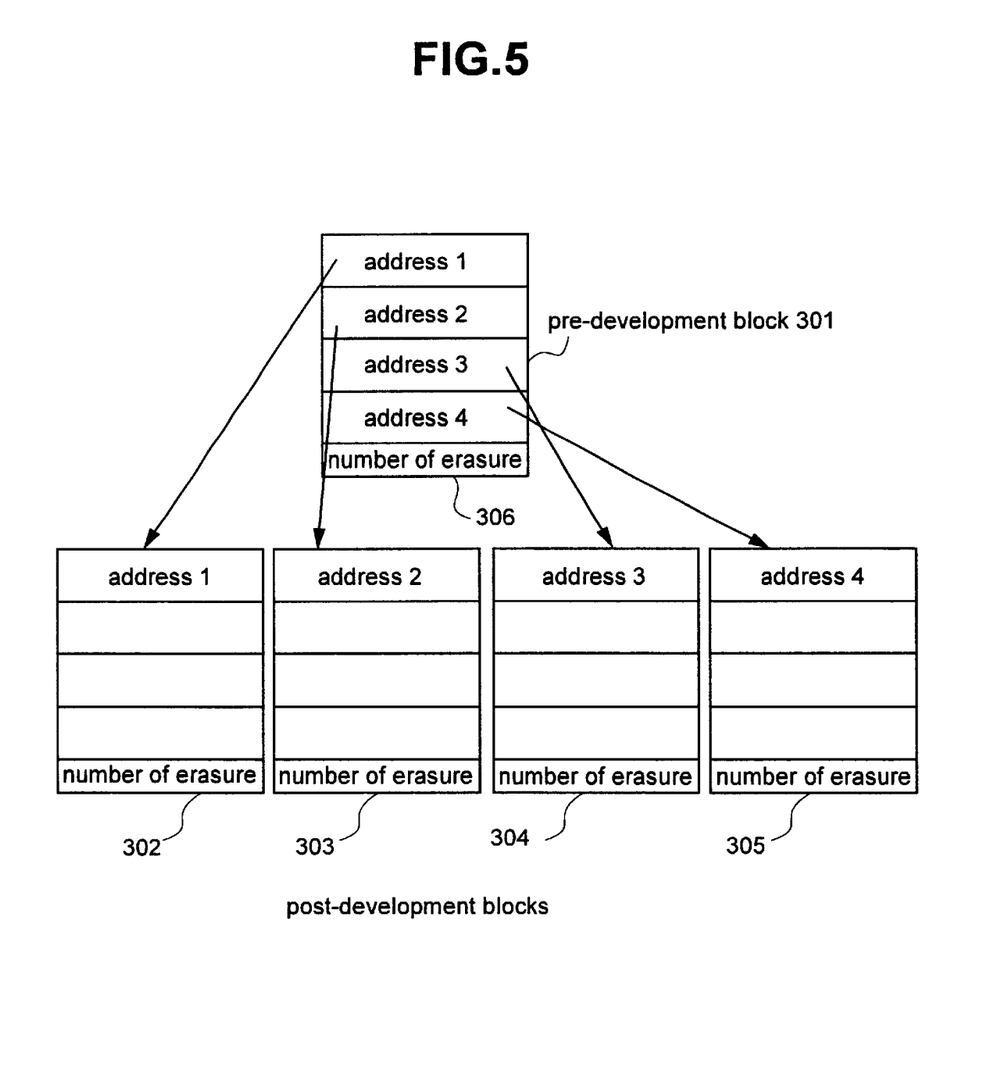
FIG. 5 is an illustration for explaining the operation of the development processing.

In the this embodiment, the rewrite is carried out for physical block developed in the development area without carrying out the rewrite for the this physical block afterwards, when the rewrite frequency was counted and was rewritten every of the usual data area 201, and the frequency exceeded the fixed frequency. FIG. 5 is the figure which explains the operation of this development processing. The same figure shows the aspect that the pre-development block 301 is developed after four development at the block 302, 303,304,305.

The pre-development block 301 is one physical block of the usual data area 201, and the data (data in proportion to logical address 1–4) of the 4 sectors minute has been stored. An erasure frequency 306 shows the frequency that the erasure was conducted for the physical block 301, and it measures the rewrite frequency of the data stored by this frequency in this block. In short, it is possible to guess that position information data as the host controls the housing data and information data for carrying out the file control, etc. have been stored for the block of which the increase of this frequency is remarkable.

Therefore, it is considered that the development processing would be carried out for the physical block in which the erasure frequency reached the specified value for example. The erasure frequency as a standard for the development processing though properly the adequate value is decided in proportion to the mounting condition, it is considered that the warranty of the flash memory chip comes for example and that it is changed, and that it chooses (erasure) possible frequency.

Still, the counting of the erasure frequency 306 is realized by reading erasure frequency 306 with the data when it is necessary, before corresponding physical block is eliminated for example, and writing with other necessary data, after the increment of the erasure frequency that carried out and read the erasure of the this physics block after the reading end was done.

Figure 6:
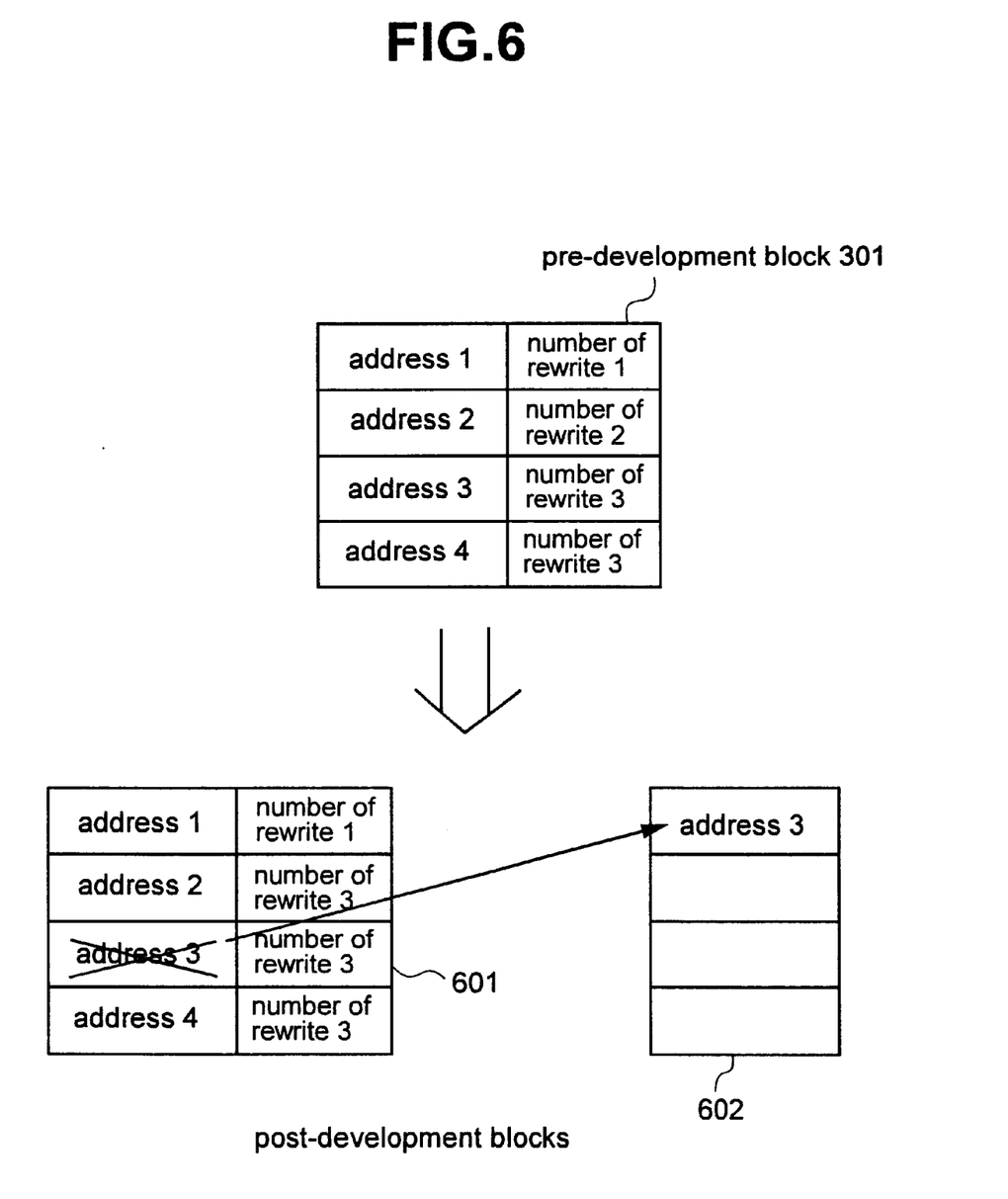
FIG. 6 is an illustration for explaining the operation of a different development processing than that of FIG. 5.

In the meantime, the post-development blocks 302,303, 304,305 are each physical blocks of the development area 202, and one sector has been stored in one physical block. In short, the data in proportion to logical addresses 3, after it carried out the erasure over the fixed frequency, and after it carried out the development processing, the data which corresponds for logical address 1 is stored in the post-development block 302, and the data in proportion to the logical addresses 2 is stored in the post-development block 303, and it is stored in the post-development block 304, and it is the post-development block logical addresses 4. It is stored in the post-development block 305. In the example of showing in FIG. 5 which explained the above, instead, it is rewritten in the each every sector, though the erasure frequency is counted and is recorded in every block, and the frequency is counted and is recorded, and the method of developing in different physical block in the development area from the sector which reached a predetermined frequency is also considered. In the case, it will remain in the physical block of the origin without developing the sector when the rewrite frequency has not reached the predetermined frequency after the development (transfer) of having sector in some physical blocks. FIG. 6 is the figure which explains the processing of such the development.

In the pre-development block 301, rewrite frequency 1–4 which shows the frequency of which dealing with sector was rewritten with the sector data in proportion to logical addresses 1–4 has been stored, as it is shown in the same figure. In such composition, rewrite frequency 601 of the third sector moves these third sector in the blocks 602 in the development area using the memory control circuit, when it reaches the predetermined frequency.

In the case in which it was done like this and case in which one rewrite frequency is high within the sector stored in some physical blocks, it is possible to prevent the futility of also developing the sector when there is no necessity of developing actually. Still, the predetermined frequency as the standard which carries out the development processing here though properly the adequate value is decided in proportion to the mounting condition, it is considered that the value (the predetermined frequency may be determined to be ¼th of the frequency of rewrites that the memory is rated to be able to handle).

Figure 7:
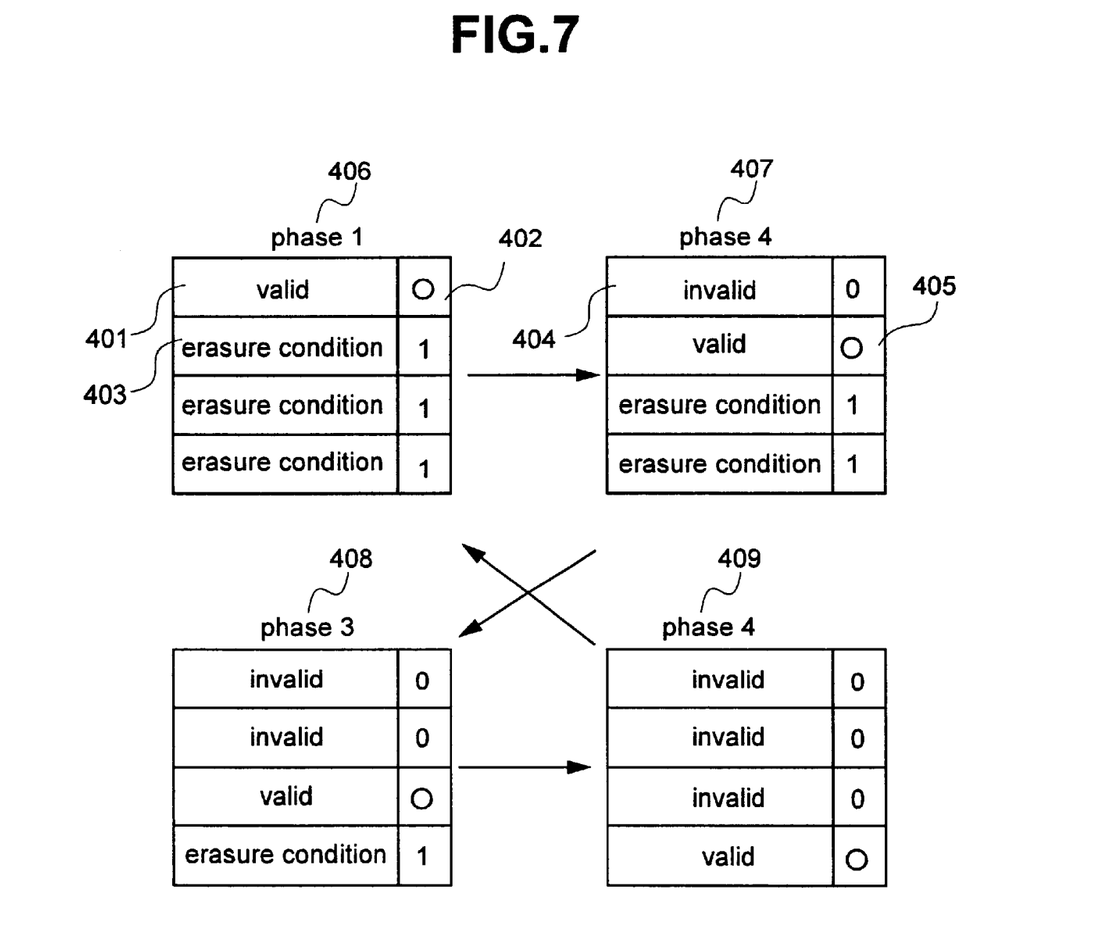
FIG. 7 illustrates rewrite processing for developed block.

FIG. 7 is the figure which showed the method of the rewrite in the physical block of the housing data after the development developed by the method of the slippage which wants to explain in FIG. 5 and FIG. 6. To begin with, the sector data is stored in one sector stored in the physical block in the first sector 401 of the physical block, when the development of the physical block with the usual data area is required, and when it is developed in the physical block 406 with the development area. The flag 402is set at "0" in order to show that the effective data in the time in the sector 401 has been stored, (phase 1). The effective data in the physical block 406 of the phase 1 in the first physical sector in the physical block has been stored, and other physical sector is the erasure condition.

Still, it has been set at the erasure condition, namely "1". The flag 402 shows whether it wrote the data in dealing with sector, and it is shown that it shows that the writing is not carried out and carries out the writing in "0" case in "1" case. This flag has been stored in the fixed area (for example, management data divisions of FIG. 3(a) and sector management data divisions of FIG. 3(b) or block management data divisions) in the each physics block, and it respectively has lowest 1 bit in proportion to the each physics sector.

Next, the sector data is written in the second physical sector area without eliminating the physical block for the physical block 406 (the sector which the this physics block allocated actually) of the phase 1, when the rewrite is directed from the host. The flag 405 is set at "0" in order to show that the effective data in the time in the second physical sector area has been stored, (phases 2). In the physical block 407 of the phases 2, since the new data was written in the second physical sector, the data of the first physical sector becomes the invalidity, and the data of the second physical sector is the usefulness, and other sector is the erasure condition. Next, it shifts for the physical block 407 of the phases 2 in phases 3, when the rewrite is directed from the host. In the physical block 408 of the phases 3, the invalid (it is old) data has been stored in the physical sector first and second, and the effective data in the third physical sector has been stored, and the fourth physical sector are the erasure condition. Similarly, it shifts for the physical block 408 of the phases 3 in the phases 4, when the rewrite is directed from the host.

The effective data in the physical block 409 of the phases 4 in the fourth physical sector has been stored, and the invalid data has been stored other physical sector.

Therefore, it rewrites from "1" to "0" in the order, as it is shown in the same figure, the flag phase 1 phases 4. Of by doing like this, that the effective sector in the each physics block is shown without doing the erasure operation, even if the erasure condition is one like the memory which the this embodiment assumes, and even if it is a case in which the writing of "0"-"1" was not possible, though it can be done as it is, and in which the writing of "1"-"0" used the memory in which erasure operation at the block unit is once the necessity. It becomes possible. When the rewrite was directed more and more for the physical block 409 of the phases 4, the this physics block is once eliminated all some, and the renewal data is written in the first physical sector afterwards, it will return in phase 1.

Figure 8:
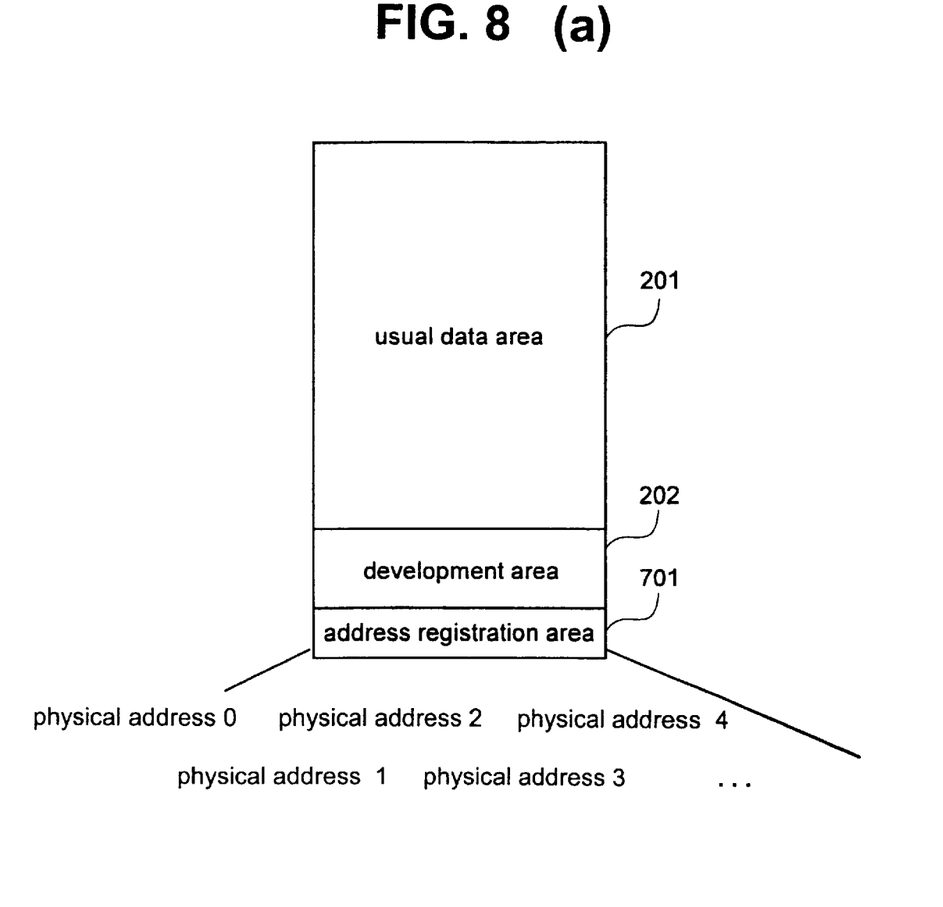
FIG. 8 illustrates the address registration for retrieving the developed address.

The control like the above will be able to suppress erasure frequency of this block for the rewrite frequency of the sector stored in this block in ¼. Next, the address operation in accessing developed sector is explained. FIG. 8 is the figure which explains the system for establishing the address translation table in the flash memory. In this case, an address registration area 701 equips generally on the memory map in addition to the usual data area 201 and the development area 202, as it is shown in the same figure. In address the registration area 701, the area which can store the development address value every physical address each has been prepared, as to register the address in proportion to all physical address of the flash memory is possible. The address registration area 701 of the same figure the development of physical block in proportion to physical address 0 (and, physical address 4) is carried out, and the condition that the development of physical block in proportion to physical address 1(-3) is not carried out is shown.

That is to say, the development address value (offset address in the development area 202) of the physical block after it the developed physical block 0 has been stored in the area 702 which physical address 0 in address the registration area 701 allocated. And, value (FFh) which shows that dealing with physical block has not been developed has been stored in the area 703 which the physical address 1 in address registration area 701 allocated. There is no problem even in the nonvolatile memory with the restriction in the rewrite frequency, since the rewrite happens, when the development was carried out until now only unlike the address translation table of the technology, and this address registration table can be used.

Figure 9:
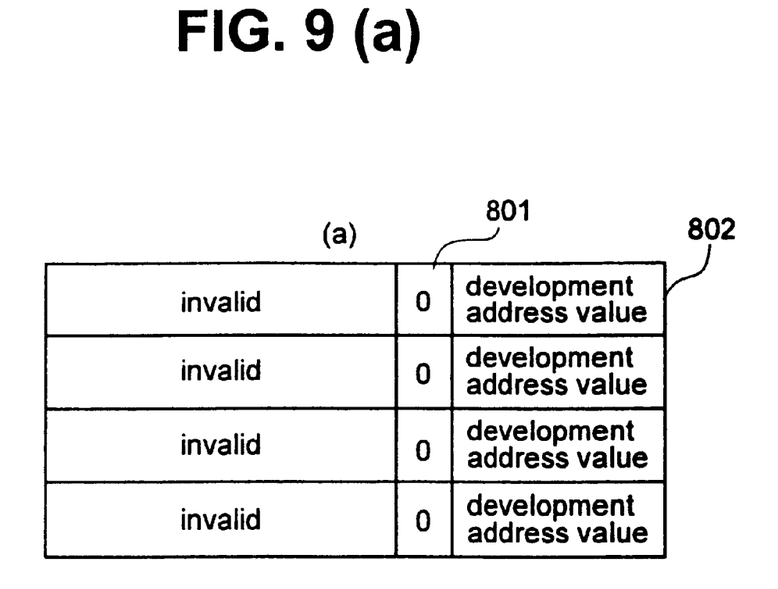
FIG. 9 is the figure illustrates registering the development address in each physics block.

And, the retrieval of the address can be also carried out easily and at high speed. Still, the physical address shown in FIG. 8 is correspondent to the address of the physical block, and for the development address value, head address of four physical blocks continuously ensured in the development processing in the development area is stored. In the meantime, it may be correspondent to not physics block in the physical address here but physical sector in the development (transfer) like the example of showing in FIG. 6 at the sector unit. That is to say, it may be able to register address value in the transfer tip every physical sector. FIG. 9 is the figure which shows the system for writing the development tip to the physical block of developed origin as a different method of the address operation. In this system, in the physical block, sector data, the flag 801, the development address value 802 are stored every, as it is shown in the same figure, sector.

The lag 801 shows that it is the flag which shows whether it has developed dealing with sector and has not developed dealing with sector in "1" (the erasure condition) case, and it is shown that dealing with sector has been developed in "0" case. The development address value 802 is address value in the development area of the physical block of which developed sector was allocated. Like the case in which it was shown in FIG. 5, the address after the development is all written with showing that it sets the flag in proportion to all sector at "0", as it is shown at FIG. 9(a), when simultaneously, all sector in one physical block are developed in the development processing, and that the data stored in all data area is invalid.

In the meantime, the address in the development tip is recorded with making the flag 801 only to be a place in the sector developed, when it one by one and individually develop it, simultaneously, in order to develop all the sector which include for the physical block as an object, and in order to show at FIG. 9(b), with "0", like the case in which it was shown in FIG. 6. ON the sector (for example, sector 804) when it has not developed, the flag 801 is "1" as, and it becomes that reading and writing be carried out to it for way and this physics block. It does not need to separately establish the thing of address registration area shown in FIG. 8, when the system for showing in FIG. 9 was adopted. In the example of explaining until now, erasure frequency of the physical block and rewrite frequency of the sector were recorded, and the development to the development area was carried out, when these frequencies reached the fixed value.

However, that erasure frequency and rewrite frequency are recorded like this the memory which memorizes erasure frequency and rewrite frequency is required, and the processing time for counting of the frequency, etc. is also required. And, in capability like, the guarantee frequency of the erasure of the memory is a standard to the last, and there are many cases in which they are usable to by far large frequency, since characteristics are different by individual memory chip.

Figure 10:
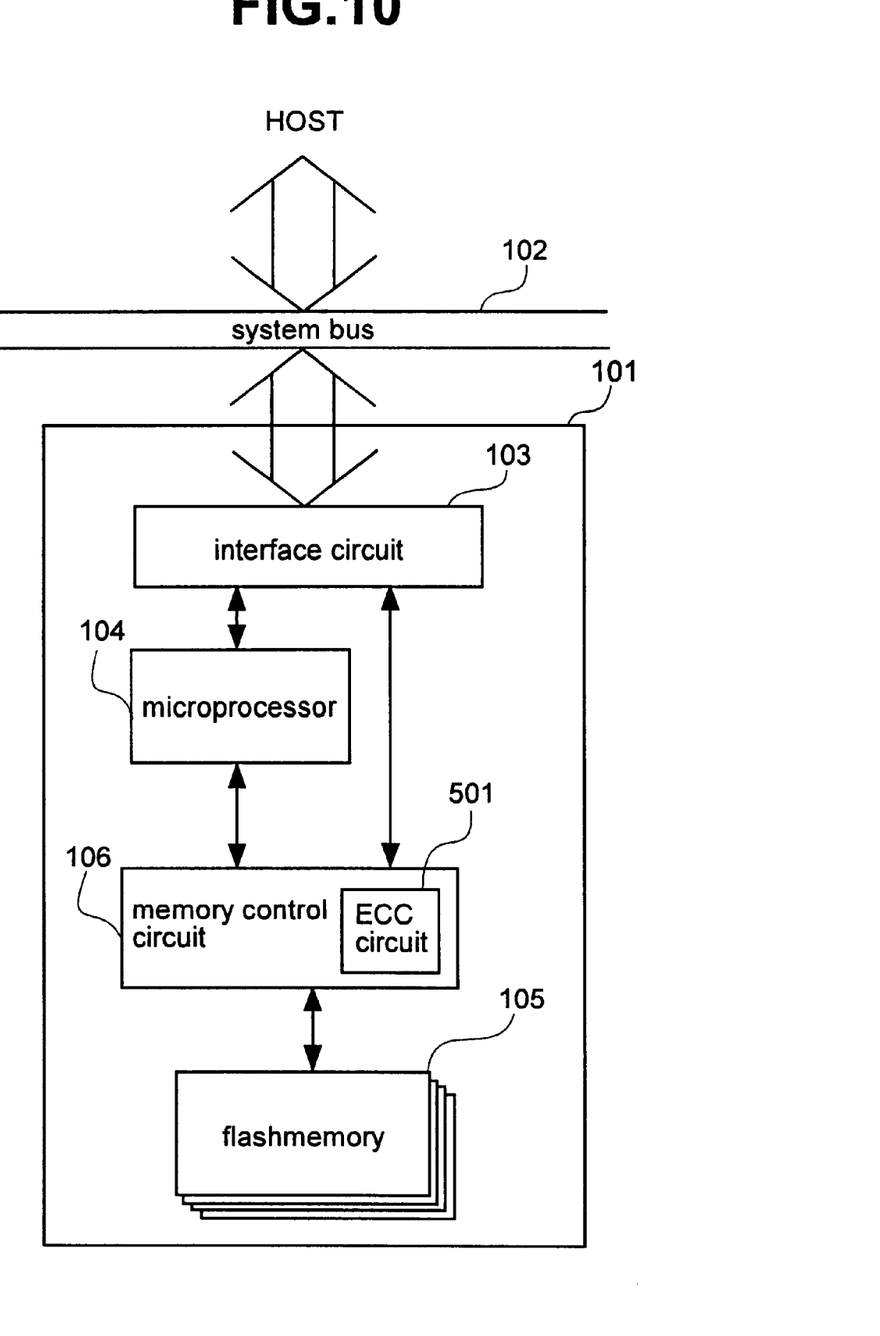
FIG. 10 illustrates an embodiment of the present invention using the ECC.

Then, it is also possible erasure frequency point of time development processing it do ECC (error detection correction code) point of time error correspondence block permission rewrite (erasure) frequency the development processing. In this, use efficiency of the flash memory improves, because the each physics block will be used to the use limit. FIG. 10 is the figure which shows the embodiment of this invention using the ECC. There is a difference from the memory 101 shown in FIG. 1 for establishing ECC circuit 501 in memory control circuit 106, as it is shown in the same figure. ECC circuit 501 the ECC code is created and is added in the writing of the data to flash memory 105, and error detect ion, correction are carried out by this utilization. The case in which the error was detected in the data read out from flash memory 105 reports the generation of the error on ECC circuit 501 in microprocessors 104, while the error is corrected. Microprocessors 104 of which the generation of the error was reported carries out the development processing of the physical block that it judges that erasure frequency of corresponding physical block exceeded the erasure permission frequency and is correspondent. This development processing is carried out by the method equal to the result of doing foregoing. Still, in usual memory, in the this embodiment, memory of the ECC code is required, and it is paid it without causing especially, the increase in the hardware, since the result of utilizing the ECC for data improvement of reliability is abounding, generally. For example, the ECC code is stored in the example of showing in FIG. 3 in management data divisions of FIG. 3(a) and sector management data divisions of FIG. 3(b), etc. Finally, the application of the memory by this invention is explained.

Figure 11:
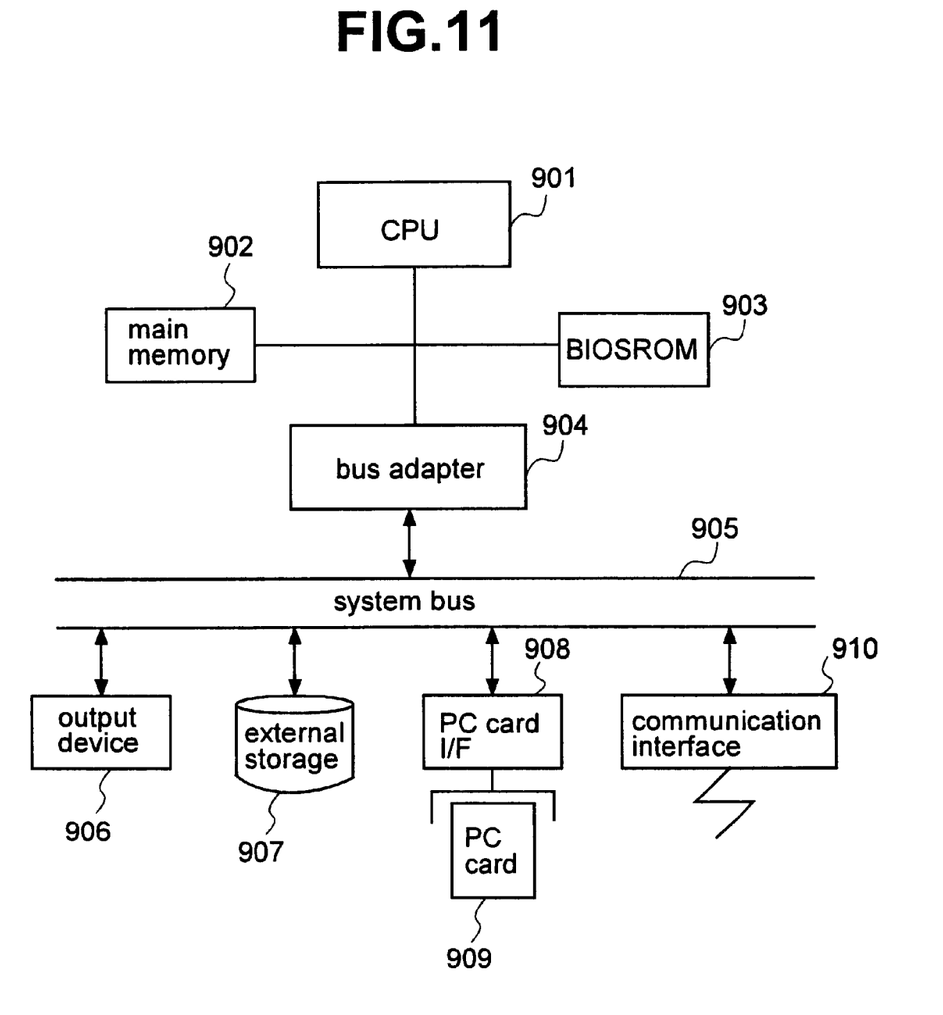
FIG. 11 illustrates an application of the memory according to the present invention.

FIG. 11 is system constitution figure which shows the application of this memory. This system is composed of processor (CPU)901 and a main memory 902 and BIOS-ROM 903 and a bus adapter 904 and an output device 906 and an external storage 907 and a PC card I/F 908 and a PC card 909 and communication interface 910, as it is shown in the same figure. Based on the main memory 902 and programs stored at BIOSROM 903, etc., CPU 901 executes the main processing the system. The main memory 902 temporarily store program and data used, when CPU 901 carries out the processing, and it is mainly composed of the volatile memory. BIOSROM 903 program for carrying out the startup processing of the system and program of the fundamental command are stored, and they are mainly composed of the nonvolatile memory.

The bus adapter 904 takes the interface between a CPU 901 and peripheral equipment. For the system bus 905, the following are connected: The bus adapter 904 and peripheral circuits and peripheral equipment. Though the external storage 907 are composed of large-capacity nonvolatile memory such as magnetic disk and optical disk generally, it is considered that this invention is applied in this external storage 907. And, PC cards 909 are connected in the PC card I/F 908. It is considered that this invention is also applied in this PC cards 909, when this PC card 909 are utilized as an external memory.

It is possible that it prevents degradation of whole memory by the fact that the rewrite of the specific data is frequently carried out or lowering of the reliability in the memory that it rewrites in the electric for the erasure processing according to this invention at the block unit and makes the possible nonvolatile memory to be memory medium and realizes the improvement in the equipment life. Especially, it is possible that it lowers the physical rewrite frequency of the area to which store the data in which the specific rewrite frequency is high and suppresses the degradation of the memory for a memory capacity of the sector which is the data management unit of the host, when flash memory by the rewrite (erasure) only in the size of the several minutes was made to be memory medium.

What is claimed is:

1. A nonvolatile memory apparatus for storing data from a host, comprising:
    a nonvolatile memory including a plurality of physical blocks and being erasable by physical block increments, each physical block including a plurality of sectors, each sector being a data management unit of said host; and
    a control unit for detecting a deteriorated condition of said each physical block of said nonvolatile memory, and for allocating data of each sector of said physical block to an erasure state sector of each of other physical blocks including a plurality of erasure state sectors in accordance with said deteriorated condition.

2. A nonvolatile memory apparatus according to claim 1, wherein said control unit writes said data stored in said erasure state sector of each of said other physical blocks to another erasure state sector of each of said other physical blocks in accordance with a rewrite indication from said host.

3. A nonvolatile memory apparatus according to claim 2, wherein said control unit reads out said data from said another sector of said other physical block in accordance with a writing indication from said host, and transmits said data to said host.

4. A nonvolatile memory apparatus according to claim 2, wherein said sector is set at invalid state before a rewrite processing,
wherein said another sector after said rewrite processing is set at valid state.

5. A nonvolatile memory apparatus according to claim 1, wherein said deteriorated condition is a rewrite frequency of said each physical block of said nonvolatile memory, and
wherein said control unit allocates said data of each sector of said physical block of which rewrite frequency exceeds a predetermined frequency to said erasure state sector of said each of other physical blocks including a plurality of erasure state sectors in accordance with said deteriorated condition.

6. A nonvolatile memory apparatus according to claim 1, wherein said deteriorated condition is a generation of an error of data in said each physical block of said nonvolatile memory,
wherein said control unit generates a code for detecting and correcting said data in a write processing, detects said error of data using said code in a read processing, and allocates said data of each sector of said physical block in which said error of data is generated to said erasure state sector of said each of other physical blocks.

7. A method for storing data from a host to a nonvolatile memory, said nonvolatile memory including a plurality of physical blocks and being erasable by physical block increments, each physical block including a plurality of sectors, each sector being a data management unit of said host, said method comprising:
detecting a deteriorated condition of said each physical block of said nonvolatile memory; and
allocating data of each sector of said physical block to an erasure state sector of each of other physical blocks including a plurality of erasure state sectors in accordance with said deteriorated condition.

8. A nonvolatile memory apparatus for storing data from a host, comprising:
a nonvolatile memory including a plurality of physical blocks and erasable by physical block increments, each physical block including a plurality of sectors, each sector being a data management unit: of said host; and
a control unit for detecting a deteriorated condition of said each physical block of said nonvolatile memory, and for allocating data of each sector of said physical block to an erasure state sector of each of other physical blocks including a plurality of erasure state sectors in accordance with one of at least a data write indication from said host, a data read indication from said host and a data rewrite indication from said host.

9. A method for storing data from a host to a nonvolatile memory, said nonvolatile memory including a plurality of physical blocks and being erasable by said physical block, each physical block including a plurality of sectors, each sector being a data management unit of said host, said method comprising:
detecting a deteriorated condition of said each physical block of said nonvolatile memory; and
allocating data of each sector of said physical block to an erasure state sector of each of other physical block including a plurality of erasure state sectors in accordance with one of at least a data write indication from said host, a data read indication from said host and a data rewrite indication from said host.

10. A nonvolatile memory apparatus for storing data from a host, comprising:
a nonvolatile memory including a plurality of physical blocks, said physical blocks including a plurality of sectors; and
a control unit for controlling said nonvolatile memory,
wherein said control unit erases said data in each physical block and counts an erasure number of each physical block, and
wherein when said erasure number of one or more of said physical block exceeds a predetermined number, said control unit divides said plurality of sectors in said one or more physical block and writes said divided sectors into other physical blocks individually.

11. A nonvolatile memory apparatus according to claim 10, wherein each sector of data written into said other physical blocks is rewritten into a different sector of each physical block in accordance with a rewrite indication from said host.

12. A nonvolatile memory apparatus according to claim 11, wherein said control unit reads out data from a sector of said other physical blocks in accordance with a writing indication from said host, and transmits said data to said host.

* * * * *